US010899909B2

(12) United States Patent
Seidel et al.

(10) Patent No.: US 10,899,909 B2
(45) Date of Patent: *Jan. 26, 2021

(54) POLYCARBONATE COMPOSITIONS WITH IMPROVED STABILISATION

(71) Applicant: Covestro Deutschland AG, Leverkusen (DE)

(72) Inventors: Andreas Seidel, Dormagen (DE); Ralf Hufen, Duisburg (DE); Hans-Jürgen Thiem, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/765,094

(22) PCT Filed: Sep. 29, 2016

(86) PCT No.: PCT/EP2016/073215
§ 371 (c)(1),
(2) Date: Jan. 22, 2019

(87) PCT Pub. No.: WO2017/055416
PCT Pub. Date: Apr. 6, 2017

(65) Prior Publication Data
US 2019/0338104 A1 Nov. 7, 2019

(30) Foreign Application Priority Data

Oct. 2, 2015 (EP) .................................... 15188176

(51) Int. Cl.
C08K 5/17 (2006.01)
C08K 3/30 (2006.01)
C08L 69/00 (2006.01)
C08L 51/04 (2006.01)
C08L 55/02 (2006.01)

(52) U.S. Cl.
CPC ............... *C08K 5/175* (2013.01); *C08K 3/30* (2013.01); *C08L 51/04* (2013.01); *C08L 55/02* (2013.01); *C08L 69/00* (2013.01); *C08K 2003/3063* (2013.01)

(58) Field of Classification Search
CPC .......... C08L 69/00; C08L 51/00; C08K 5/175
See application file for complete search history.

(56) References Cited

U.S. PATENT DOCUMENTS

| | | | |
|---|---|---|---|
| 3,332,912 A * | 7/1967 | Stricker | ............... C08K 5/175 524/238 |
| 3,419,634 A | 12/1968 | Vaughn, Jr. | |
| 3,553,167 A | 1/1971 | Schnell et al. | |
| 3,692,744 A | 9/1972 | Rich et al. | |
| 4,075,173 A | 2/1978 | Maruyama et al. | |
| 4,176,224 A | 11/1979 | Bier et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 4,982,014 A | 1/1991 | Freitag et al. | |
| 5,045,580 A * | 9/1991 | Kitamura | ............... C08K 5/175 524/147 |
| 5,420,181 A | 5/1995 | Eichenauer et al. | |
| 6,303,735 B1 * | 10/2001 | Shimoda | ............... C08G 64/42 528/196 |
| 7,943,686 B2 * | 5/2011 | Seidel | ..................... C08L 69/00 524/117 |
| 9,056,977 B2 | 6/2015 | Seidel | |
| 9,617,417 B2 | 4/2017 | Avtomonov et al. | |
| 9,637,632 B2 | 5/2017 | Seidel et al. | |
| 2005/0159518 A1 * | 7/2005 | Miyamoto | .......... C08L 2666/04 524/155 |
| 2006/0287422 A1 | 12/2006 | Volkers et al. | |
| 2007/0135544 A1 | 6/2007 | Seidel et al. | |
| 2008/0221326 A1 * | 9/2008 | Bosch | ..................... B01J 29/40 544/352 |
| 2008/0258338 A1 | 10/2008 | Seidel et al. | |

(Continued)

FOREIGN PATENT DOCUMENTS

AU 2153499 A 6/1999
CA 1100681 A 5/1981
(Continued)

OTHER PUBLICATIONS

Machine translated English language equivalent of JP Application H06-217296 which is the same as JP 08073585-A as evidenced by the foreign document (1996, 9 pages).*

(Continued)

*Primary Examiner* — Brieann R Johnston
(74) *Attorney, Agent, or Firm* — Faegre Drinker Biddle & Reath LLP

(57) ABSTRACT

The invention relates to compositions containing (A) at least one polymer selected from the groups of aromatic polycarbonates and aromatic polyester carbonates and (B) at least one Bronsted-acidic compound, such as ethylenediaminetetraacetic acid (EDTA), and also relates to a process for producing compositions using components (A), (B) and optionally further components, wherein at least one of the employed components is alkaline or contains alkaline constituents, to compositions obtained by this process and to the use of the compositions for producing molded articles and to the molded articles themselves.

11 Claims, No Drawings

(56) References Cited

U.S. PATENT DOCUMENTS

| | | | | | |
|---|---|---|---|---|---|
| 2014/0275339 | A1* | 9/2014 | Seidel | ............ | C08K 3/24 523/351 |
| 2015/0218369 | A1* | 8/2015 | Okamoto | ............ | C08L 69/00 525/186 |
| 2019/0375942 | A1* | 12/2019 | Hindelang | ............ | C09C 1/309 |

FOREIGN PATENT DOCUMENTS

| | | |
|---|---|---|
| CN | 104987693 A * | 10/2015 |
| DE | 1900270 A1 | 11/1969 |
| DE | 1495626 B1 | 6/1971 |
| DE | 2232877 A1 | 1/1974 |
| DE | 2407674 A1 | 10/1974 |
| DE | 2703376 A1 | 8/1977 |
| DE | 2714544 A1 | 10/1977 |
| DE | 2715932 A1 | 10/1978 |
| DE | 2842005 A1 | 4/1980 |
| DE | 3000610 A1 | 7/1980 |
| DE | 2940024 A1 | 4/1981 |
| DE | 3007934 A | 9/1981 |
| DE | 3334782 A1 | 10/1984 |
| DE | 3832396 A1 | 2/1990 |
| DE | 19753542 A1 | 6/1999 |
| EP | 0194719 A2 | 9/1986 |
| EP | 0576950 A2 | 1/1994 |
| GB | 1464449 A | 2/1977 |
| JP | S5912961 A | 1/1984 |
| JP | H0218332 B2 | 4/1990 |
| JP | 08073585 A * | 3/1996 |
| JP | 11246634 A * | 9/1999 |
| JP | 2008161824 A | 7/2008 |
| WO | WO-8502622 A1 | 6/1985 |
| WO | WO-2007065579 A1 | 6/2007 |
| WO | WO-2008122359 A1 | 10/2008 |
| WO | WO-2009118114 A1 | 10/2009 |
| WO | WO-2010063381 A1 * | 6/2010 ............ C08K 5/527 |
| WO | WO-2013060685 A1 | 5/2013 |
| WO | WO-2013060687 A1 | 5/2013 |

OTHER PUBLICATIONS

Machine translated English language equivalent of CN 104987693 (2015, 6 pages).*
Google translation of JP 11246634 (1999, 6 pages).*
International Search Report for PCT/EP2016/073215 dated Dec. 14, 2016.
Written Opinion of the International Searching Authority for PCT/EP2016/073215 dated Dec. 14, 2016.

* cited by examiner

POLYCARBONATE COMPOSITIONS WITH IMPROVED STABILISATION

CROSS-REFERENCE TO RELATED APPLICATIONS

This application is a national stage application (under 35 U.S.C. § 371) of PCT/EP2016/073215, filed Sep. 29, 2016, which claims benefit of European Application No. 15188176.0, filed Oct. 2, 2015, both of which are incorporated herein by reference in their entirety.

The present invention relates to thermoplastic polycarbonate compositions containing Brønsted acidic compounds, to a process for producing thermoplastic polycarbonate compositions, to the use of the compositions for producing molded articles and to the molded articles themselves.

BACKGROUND OF THE INVENTION

In the production of polycarbonate compositions alkaline components or components containing alkaline constituents are often to be used because certain desired technical properties or functions may be achieved in this way or else a further workup (purification) of the components is not advantageous for process engineering reasons, is not possible or is not desired for economic reasons.

The alkaline constituents which may be present in the components used for producing impact-modified polycarbonate compositions are for example manufacture-dependent impurities and/or additives intentionally added to the components.

Thus for example many commercially available fillers such as for example talc or other commercially available polymer additives such as for example a number of antistats (for example polyetheramides), lubricants and demolding agents (for example ethylene bisstearamide), stabilizers (for example benzotriazoles or sterically hindered amines used as light stabilizers), pigments (for example titanium dioxide), nitrogen-containing organic dyes (for example azo compounds or pyrazolones) and nitrogen-containing flame retardants (for example phosphonatamines) exhibit alkaline behavior or else contain alkaline constituents. In addition, impact modifiers used in the production/compounding of polycarbonate compositions often contain alkaline constituents as a consequence of manufacture. This also includes residual amounts of alkaline substances employed as polymerization aids, for example as emulsifiers in emulsion polymerization or in workup processes, for example during precipitation. The polycarbonate itself may also contain residual amounts of alkaline constituents as a consequence of manufacture, for example traces of sodium hydroxide from washing and/or alkaline polymerization catalysts.

The alkaline components or constituents may catalytically decompose the polycarbonate at high temperatures such as those which typically occur in the production and processing of polycarbonate molding materials. Such polycarbonate degradation often manifests in impairment of the properties of the molding materials or in surface changes. The choice of possible input materials for such polycarbonate compositions is very severely limited as a result.

It is known from the prior art to add acidic compounds to polycarbonate compositions to neutralize the harmful effect of alkaline compounds or alkaline constituents.

WO 85/02622 A1 discloses color-stabilized polycarbonate-polyester compositions containing aromatic polycarbonate, polyester and 0.01% to 1.00% by weight of a phosphoroacidic compound selected from the group consisting of phosphorous acid, phenylphosphonic acid and derivatives of phosphorous acid substituted with fluorinated hydrocarbon groups.

JP 02-018332 B discloses polycarbonate resins stabilized with 2-20 ppm of phosphorous acid and 50-300 ppm of tris(2,6-di-tert-butylphenyl)phosphite having good mechanical properties, hot water resistance and reduced yellowing under thermal stress.

US 2006/0287422 A1 describes thermoplastic compositions containing polycarbonate, mineral fillers and an acid or an acid salt and optionally further thermoplastic polymers as blend partners, for example selected from the group containing polyester and (rubber-modified) vinyl (co)polymers. The application discloses that through the addition of the acid or of the acidic salt the thermally induced polycarbonate molecular weight degradation is reduced and impact strength and ductility are thus improved.

EP 0 576 950 A2 and WO 2007/065579 A1 describe polycarbonate-ABS compositions which contain alkaline constituents and are stabilized with organic carboxylic acids.

WO 2010/063381 A1 describes impact-modified polycarbonate compositions having an improved combination of hydrolysis and processing stability containing polycarbonate, an alkalinically contaminated emulsion graft polymer and an acidic phosphorus compound having at least one P—OH functionality.

WO 2009/118114 A1 discloses polycarbonate compositions having an improved combination of light natural tone and good hydrolysis and processing stability containing polycarbonate, rubber-modified graft polymer containing manufacture-dependent residues of a fatty acid salt emulsifier, wherein the graft polymer has a pH of greater than 7 in aqueous dispersion, and an acidic additive. Disclosed as acidic additives in this application are hydroxy-functionalized mono- and polycarboxylic acids and also phosphoric acid and sodium/potassium salts of phosphoric acid.

WO 2013/060687 A1 discloses polycarbonate compositions having a good natural tone, improved thermal stability and improved processing stability measured by the stability of the degree of gloss while varying the processing temperature containing a Brønsted-acidic compound applied to an inorganic or organic absorber or absorber. Disclosed by way of example as Brønsted-acidic compounds are phosphoric acid, phosphorous acid, phosphinic acid and alkylated/arylated derivatives thereof.

WO 2013/060685 A1 discloses a process for producing stabilized impact-modified polycarbonate compositions in which an acidic compound in a high dilution aqueous solution is applied to a graft polymer powder before this powder thus moistened with the aqueous acid solution is subjected to compounding.

However, the addition of the acids described in the prior art often results in disadvantageous properties in the polycarbonate compositions such as severe molecular weight degradation or occurrence of surface defects under hot and humid storage conditions, impairment of natural tone and/or a severe change in surface gloss at high processing temperatures or else allows a stable production process only within a very limited thermal processing window.

There was therefore a need to provide polycarbonate compositions which even when using one or more alkaline starting components or starting components containing alkaline constituents feature an improved combination of light inherent color, high gloss level, good processing stability measured by degradation of the polycarbonate molecular weight and by change in the inherent color (yellowing) and change (reduction) in the gloss level under thermal stress during forming and an improved hydrolysis stability measured by degradation of the polycarbonate molecular weight in a hot and humid climate with high relative humidity and which are suitable for producing molded articles having a surface with a high gloss level and few surface defects after storage under hot and humid conditions.

It was further desirable to provide polycarbonate compositions which also exhibit the advantageous properties even when at least one starting component used for producing the composition is a polymer which as a consequence of manufacture contains an alkali metal, alkaline earth metal, aluminum or transition metal salt of a strong mineral acid, for example a chloride, sulfate or nitrate salt.

BRIEF SUMMARY OF THE INVENTION

It has now been found that, surprisingly, compositions containing
A) at least one polymer selected from the group of aromatic polycarbonates and aromatic polyester carbonates and
B) at least one Brønsted-acidic compound selected from the group consisting of compounds of general formulae (I) and (II)

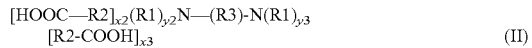

wherein
R1 represents optionally functionalized or heteroatom-substituted alkyl, aryl or cycloalkyl,
R2 represents $C_1$- to $C_8$-alkylene or $C_2$- to $C_8$-alkylidene, preferably $C_1$- to $C_4$-alkylene or $C_2$- to $C_4$-alkylidene, more preferably $C_1$- to $C_2$-alkylene or $C_2$- to $C_3$-alkylidene, very particularly preferably methylene,
R3 represents $—(CH_2)_n—$, $—(CH_2)_n[O(CH_2)_n]_m—$ or $—(CH_2)_n[NR4(CH_2)_n]_m—$,
n is an integer, preferably 1 or 2, particularly preferably 2,
m is an integer, preferably 1 or 2,
R4 represents optionally functionalized or heteroatom-substituted alkyl, aryl or cycloalkyl, preferably $—CH_2COOH$,
x1 is an integer between 1 and 3, preferably 3.
x2 and x3 are respectively 1 or 2, preferably 2
and
y1 is given by the formula y1=3−x1,
y2 by the formula y2=2−x2,
y3 by the formula y3=2−x3,
and wherein in compounds having a plurality of radicals R1 and/or R2 these may independently of one another represent different or identical radicals having the abovementioned definitions,
have the advantageous properties.

DETAILED DESCRIPTION OF THE INVENTION

The compositions according to the invention preferably contain 0.00001 to 0.5% by weight of component B.

In one embodiment the compositions are produced using one or more alkaline components or components containing alkaline constituents.

In a preferred embodiment the compositions contain not only components A and B but also, as component C, one or more rubber-containing graft polymers and/or rubber-free vinyl (co)polymers.

In a further preferred embodiment the compositions contain not only A and B but also, as component D, additives.

In a further preferred embodiment the compositions contain the components A, B, C and D.

In a further embodiment the compositions contain not only A, B, optionally C and optionally D but also, as component E, one or more polyesters. In these compositions it is preferable when only a rubber-containing graft polymer is employed as component C.

In a preferred embodiment the compositions consist of the components A, B, C and D.

In a further embodiment the compositions contain a polymer which contains an alkali metal, alkaline earth metal, aluminum or transition metal salt of a strong mineral acid, for example a chloride, sulfate or nitrate salt.

In a specific embodiment the compositions contain a polymer which contains an alkaline earth metal salt of a strong mineral acid, for example magnesium sulfate and/or calcium chloride.

In a further specific embodiment the salt is contained in component C.

In a preferred embodiment component B is employed in the minimum amount necessary for achieving the desired processing stability. This amount depends on the type and amounts of the alkaline components and/or components containing alkaline constituents and thus cannot generally be estimated but rather must be determined for the respective composition by a series of experiments with different amounts of component B.

There was a further need to provide a thermal process for producing thermoplastic polycarbonate compositions having the above-described properties which is stable over a widened process window, i.e. also at elevated melt temperatures and/or prolonged residence times, even when using one or more alkaline starting components or starting components containing alkaline constituents.

The invention therefore further provides a process containing the steps (i), (ii) and optionally (iii), characterized in that
in a first step (i)
the above-mentioned components A) and B) and optionally further components are heated by supplying thermal and/or mechanical energy to melt at least component A, the components are dispersed in one another and subsequently the resulting composition present in the form of a melt is optionally degassed by applying negative pressure,
and in a further step (ii)
the resulting composition is resolidified by cooling
and in a further step (iii) is pelletized,
wherein these further steps (ii) and (iii) may be performed in any desired sequence.

Thus, in processes in which both steps (ii) and (iii) are employed, either the melt may be initially cooled and thus solidified and subsequently pelletized or else, alternatively, the melt may be cut and afterwards solidified by cooling.

One example of the former embodiment is strand pelletization while an example of the alternative embodiment is underwater pelletization.

In one embodiment one or more alkaline components or components containing alkaline constituents are employed in this process.

The process according to the invention is performed using melt compounder units. Preferred units are single-screw extruders with or without kneading pins, internal kneaders, co-kneaders, planetary screw extruders, ring extruders and twin-screw or multi-screw extruders. The twin-screw or multi-screw extruders used may be corotating or counterrotating and close-meshing or non-intermeshing.

Particular preference is given to co-kneaders, corotating twin-screw or multi-screw extruders and ring extruders.

Particular preference is given to corotating, close-meshing twin-screw extruders.

In terms of the components employed in the process according to the invention the same preferred ranges apply as described above for the compositions according to the invention.

In a preferred embodiment the compositions according to the invention in the process according to the invention are produced from:
10 to 99.995 parts by wt, more preferably 30 to 95 parts by wt, particularly preferably 40 to 90 parts by wt and very particularly preferably 50 to 80 parts by wt of component A,
0.00001 to 0.5 parts by wt, more preferably 0.0001 to 0.3 parts by wt, particularly preferably 0.001 to 0.2 parts by wt and very particularly preferably 0.01 to 0.1 parts by wt of component B,
0 to 90 parts by wt, more preferably 0 to 70 parts by wt, particularly preferably 1 to 60 parts by wt and very particularly preferably 10 to 50 parts by wt of component C,
0 to 50 parts by wt, more preferably 0.1 to 40 parts by wt, particularly preferably 0.2 to 30 parts by wt and very particularly preferably 0.5 to 25 parts by wt of component D, wherein the sum of the parts by weight of components A to D is normalized to 100.

In a further embodiment the compositions according to the invention in the process according to the invention are produced from:
10 to 99.995 parts by wt, more preferably 30 to 95 parts by wt, particularly preferably 40 to 90 parts by wt and very particularly preferably 50 to 80 parts by wt of component A,
0.00001 to 0.5 parts by wt, more preferably 0.0001 to 0.3 parts by wt, particularly preferably 0.001 to 0.2 parts by wt and very particularly preferably 0.01 to 0.1 parts by wt of component B,
0 to 50 parts by wt, more preferably 0 to 40 parts by wt, particularly preferably 1 to 30 parts by wt and very particularly preferably 5 to 20 parts by wt of component C,
0 to 50 parts by wt, more preferably 0.1 to 40 parts by wt, particularly preferably 0.2 to 30 parts by wt and very particularly preferably 0.5 to 25 parts by wt of component D,
1 to 90 parts by wt, more preferably 10 to 70 parts by wt, particularly preferably 15 to 60 parts by wt and very particularly preferably 20 to 50 parts by wt of component E, wherein in the case where component E is employed component C is selected from one or more graft polymers having gel contents of in each case at least 75% by weight based on component C and wherein the sum of the parts by weight of components A to E is normalized to 100.

A further embodiment of the invention is a process for improving the combination of light inherent color, high gloss level, good processing stability and hydrolysis stability of polycarbonate compositions in which one or more alkaline starting components or starting components containing alkaline constituents and at least one acid according to component B are employed and in which the required amount of acid is determined by experiment, preferably through an experimental series with different acid concentrations.

A further embodiment of the invention is the use of Brønsted-acidic compounds according to formula (I) or (II) for stabilizing polycarbonate compositions optionally produced from one or more alkaline starting compounds or starting compounds containing alkaline constituents.

A further embodiment of the invention is the use of Brønsted-acidic compounds according to formula (I) or (II) for improving the combination of light inherent color, high gloss level, good processing stability and hydrolysis stability of polycarbonate compositions optionally produced from one or more alkaline starting compounds or starting compounds containing alkaline constituents.

Component A

Aromatic polycarbonates and/or aromatic polyester carbonates according to component A which are suitable according to the invention are known from the literature or can be produced by processes known from the literature (for production of aromatic polycarbonates see by way of example Schnell, "Chemistry and Physics of Polycarbonates", Interscience Publishers, 1964 and also DE-AS (German Published Specification) 1 495 626, DE-A 2 232 877, DE-A 2 703 376, DE-A 2 714 544, DE-A 3 000 610, DE-A 3 832 396; for production of aromatic polyester carbonates for example DE-A 3 077 934).

Aromatic polycarbonates are produced for example by reaction of diphenols with carbonyl halides, preferably phosgene and/or with aromatic diacyl dihalides, preferably dihalides of benzenedicarboxylic acids, by the interfacial process, optionally using chain terminators, for example monophenols, and optionally using trifunctional or more than trifunctional branching agents, for example triphenols or tetraphenols. Production via a melt polymerization process by reaction of diphenols with, for example, diphenyl carbonate is likewise possible.

Diphenols for the production of the aromatic polycarbonates and/or aromatic polyestercarbonates are preferably those of formula (I)

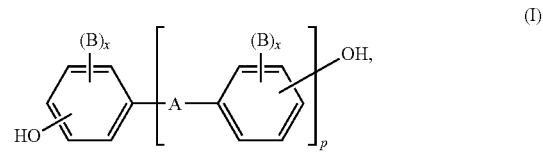

(I)

wherein
A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which further aromatic rings optionally containing heteroatoms may be fused,
or a radical of formula (II) or (III)

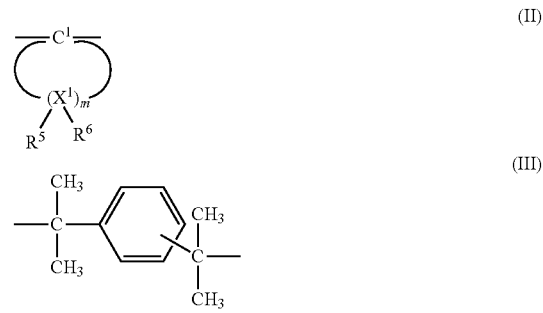

B is in each case $C_1$ to $C_{12}$-alkyl, preferably methyl, halogen, preferably chlorine and/or bromine,
x is independently at each occurrence 0, 1 or 2,
p is 1 or 0, and $R^5$ and $R^6$ are individually choosable for each $X^1$ and are independently of one another hydrogen or $C_1$ to $C_6$-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes and also ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulfide, 4,4'-dihydroxybiphenyl sulfone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-bis(4-hydroxyphenyl)propane (bisphenol A) is especially preferred.

The diphenols may be used individually or in the form of any desired mixtures. The diphenols are known from the literature or obtainable by processes known from the literature.

Examples of chain terminators suitable for producing the thermoplastic aromatic polycarbonates include phenol, p-chlorophenol, p-tert-butylphenol or 2,4,6-tri bromophenol, but also long-chain alkylphenols such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be employed is generally between 0.5 mol % and 10 mol % based on the molar sum of the diphenols used in each case.

The thermoplastic aromatic polycarbonates may be branched in a known manner, and preferably through incorporation of 0.05 to 2.0 mol %, based on the sum of the diphenols used, of trifunctional or more than trifunctional compounds, for example those having three or more phenolic groups.

Both homopolycarbonates and copolycarbonates are suitable. Production of inventive copolycarbonates according to component A may also employ 1% to 25% by weight, preferably 2.5% to 25% by weight, based on the total amount of diphenols to be employed, of polydiorganosiloxanes having hydroxyaryloxy end groups. These are known (U.S. Pat. No. 3,419,634) and can be produced by processes known from the literature. The production of polydiorganosiloxane-containing copolycarbonates is described in DE-A 3 334 782.

Preferred polycarbonates are not only the bisphenol A homopolycarbonates but also the copolycarbonates of bisphenol A comprising up to 15 mol %, based on the molar sums of diphenols, or other diphenols mentioned as preferred or particularly preferred, in particular 2,2-bis(3,5-dibromo-4-hydroxyphenyl)propane.

Aromatic dicarbonyl dihalides for producing aromatic polyestercarbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio of from 1:20 to 20:1.

Production of polyestercarbonates additionally makes concomitant use of a carbonyl halide, preferably phosgene, as a bifunctional acid derivative.

Chain terminators contemplated for the production of the aromatic polyestercarbonates are not only the abovementioned monophenols but also the chlorocarbonic esters of these, and also the acyl chlorides of aromatic monocarboxylic acids, which can optionally have substitution by $C_1$ to $C_{22}$-alkyl groups or by halogen atoms; aliphatic $C_2$ to $C_{22}$-monocarbonyl chlorides can also be used as chain terminators here.

The amount of chain terminators is in each case 0.1 to 10 mol % based on moles of diphenol in the case of the phenolic chain terminators and on moles of dicarbonyl dichloride in the case of monocarbonyl chloride chain terminators.

The aromatic polyestercarbonates may also incorporate aromatic hydroxycarboxylic acids.

The aromatic polyestercarbonates may be either linear or else branched in a known manner (in this connection see DE-A 2 940 024 and DE-A 3 007 934).

Branching agents that may be used are for example tri- or polyfunctional carbonyl chlorides, such as trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in amounts of 0.01 to 1.0 mol % (based on dicarbonyl dichlorides employed) or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol % based on diphenols employed. Phenolic branching agents may be initially charged with the diphenols, acyl chloride branching agents may be introduced together with the acyl dichlorides.

The proportion of carbonate structural units in the thermoplastic aromatic polyestercarbonates may be varied as desired. The proportion of carbonate groups is preferably up to 100 mol %, in particular up to 80 mol %, particularly preferably up to 50 mol %, based on the sum of ester groups and carbonate groups. Both the ester fraction and the carbonate fraction of the aromatic polyestercarbonates may be present in the polycondensate in the form of blocks or randomly distributed.

In a preferred embodiment component A has a weight-average molecular weight Mw (determined by gel permeation chromatography (GPC) in methylene chloride with a polycarbonate standard) of 15 000 g/mol to 50 000 g/mol, preferably from 22 000 g/mol to 35 000 g/mol, in particular from 24 000 to 32 000 g/mol.

A polycarbonate or polyester carbonate or a mixture of a plurality of polycarbonates and/or polyester carbonates according to the description hereinabove may be employed as component A.

Component B

Employed as component B are Brønsted-acidic compounds selected from the group consisting of compounds of general formulae (I) and (II)

$$(R1)_{y1}\text{-N---}[R2\text{-COOH}]_{x1} \quad (I)$$

$$[HOOC\text{---}R2]_{x2}(R1)_{y2}N\text{---}(R3)\text{-N}(R1)_{y3}[R2\text{-COOH}]_{x3} \quad (II)$$

wherein
R1 represents optionally functionalized or heteroatom-substituted alkyl, aryl or cycloalkyl,
R2 represents $C_1$- to $C_8$-alkylene or $C_2$- to $C_8$-alkylidene, preferably $C_1$- to $C_4$-alkylene or $C_2$- to $C_4$-alkylidene, more preferably $C_1$- to $C_2$-alkylene or $C_2$- to $C_3$-alkylidene, very particularly preferably methylene,
R3 represents —$(CH_2)_n$—, —$(CH_2)_n[O(CH_2)_n]_m$— or —$(CH_2)_n[NR4(CH_2)_n]_m$—,
n is an integer, preferably 1 or 2, particularly preferably 2,
m is an integer, preferably 1 or 2,
R4 represents optionally functionalized or heteroatom-substituted alkyl, aryl or cycloalkyl, preferably —$CH_2COOH$,
x1 is an integer between 1 and 3, preferably 3,
x2 and x3 are respectively 1 or 2, preferably 2
and
y1 is given by the formula y1=3–x1,
y2 by the formula y2=2–x2,
y3 by the formula y3=2–x3,
and wherein in compounds having a plurality of radicals R1 and/or R2 these may independently of one another represent different or identical radicals having the abovementioned definitions.

Component B is preferably selected from the following compounds:

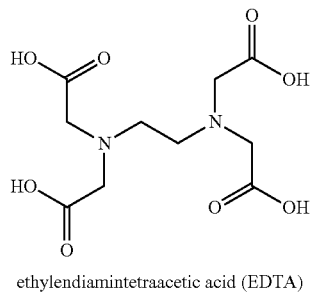

ethylendiamintetraacetic acid (EDTA)

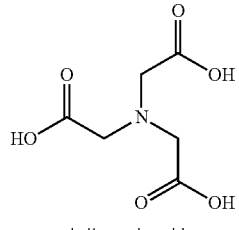

nitriloacetic acid

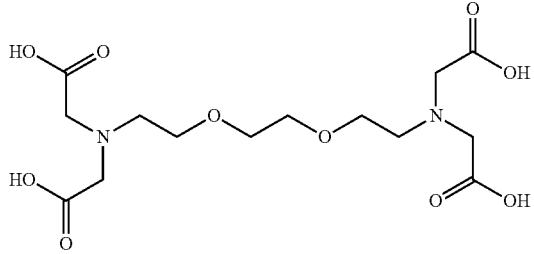

ethylene glycol bis(aminoethylether)-N,N,N',N'-tetraacetic acid (EGTA)

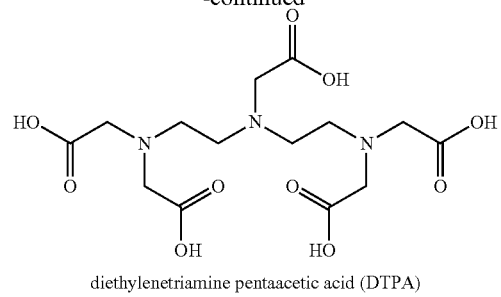

diethylenetriamine pentaacetic acid (DTPA)

Component B is particularly preferably ethylenediamine tetraacetic acid (EDTA).

Component C

Employed as component C are C1, C2 or C3 or a mixture of a plurality of these components.

Component C1

Employed as component C1 are graft polymers, produced in the emulsion polymerization process, of
C1.1) 5% to 95% by weight, preferably 10% to 70% by weight, particularly preferably 20% to 60% by weight, based on component C1, of a mixture of
C1.1.1) 65% to 85% by weight, preferably 70% to 80% by weight, based on C1.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and
C1.1.2) 15% to 35% by weight, preferably 20% to 30% by weight, based on C1.1, of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)
on
C1.2) 95% to 5% by weight, preferably 90% to 30% by weight, particularly preferably 80% to 40% by weight, based on component C1, of at least one elastomeric graft substrate.

The graft substrate preferably has a glass transition temperature <0° C., more preferably <–20° C., particularly preferably <–60° C.

Glass transition temperatures, unless stated otherwise in the present invention, are determined by means of dynamic differential calorimetry (DSC) to the standard DIN EN 61006 at a heating rate of 10 K/min, with definition of the Tg as the midpoint temperature (tangent method), and nitrogen as protective gas.

The graft particles in component C1 preferably have a median particle size (D50) of 0.1 to 0.8 μm, preferably of 0.15 to 0.6 μm, particularly preferably of 0.2 to 0.5 μm.

The median particle size D50 is the diameter with 50% by weight of the particles above it and 50% by weight below it.

The graft particle size distribution and values derived therefrom are determined by ultracentrifugation (W. Scholtan, H. Lange, Kolloid, Z. and Z. Polymere 250 (1972), 782-796).

In a preferred embodiment the emulsion graft polymer according to component C1 contains less than 15% by weight, particularly preferably less than 10% by weight, very particularly preferably less than 5% by weight, based on the gel fraction of the polymer, of graft particles having a particle diameter of greater than 800 mm.

Preferred monomers C1.1.1 are selected from at least one of the monomers styrene, α-methylstyrene and methyl methacrylate; preferred monomers C1.1.2 are selected from at least one of the monomers acrylonitrile, maleic anhydride and methyl methacrylate.

Particularly preferred monomers are C1.1.1 styrene and C1.1.2 acrylonitrile.

Graft substrates C1.2 suitable for the graft polymers C1 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting).

Preferred graft substrates C1.2 are diene rubbers (for example based on butadiene or isoprene), diene-vinyl block copolymer rubbers (for example based on butadiene and styrene blocks), copolymers of diene rubbers with further copolymerizable monomers (for example according to C1.1.1 and C1.1.2) and mixtures of the abovementioned rubber types. Particular preference is given to pure polybutadiene rubber and styrene-butadiene block copolymer rubber.

The gel content of the graft polymers is at least 15% by weight, preferably at least 60% by weight, particularly preferably at least 75% by weight (measured in acetone).

The gel content of the graft polymers is, unless otherwise stated in the present invention, determined at 25° C. as the insoluble fraction in acetone as the solvent (M. Hoffmann, H. Krömer, R. Kuhn, Polymeranalytik I and II [Polymer Analysis I and II], Georg Thieme-Verlag, Stuttgart 1977).

The graft polymers C1 are prepared by free-radical polymerization.

The graft polymer C1 generally comprises as a consequence of manufacture free copolymer, i.e. copolymer not chemically bound to the rubber graft substrate, of C1.1.1 and C1.1.2, which is soluble in suitable solvents (e.g. acetone).

Component C2

Employed as component C2 are graft polymers, produced in a bulk, solution or suspension polymerization process, of,
C2.1) 5% to 95% by weight, preferably 80% to 93% by weight, particularly preferably 85% to 92% by weight, very particularly preferably 87% to 93% by weight, based on component C2, of a mixture of
C2.1.1) 65% to 85% by weight, preferably 70% to 80% by weight, based on the mixture C.2.1 of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and
C2.1.2) 15% to 35% by weight, preferably 20% to 30% by weight, based on the mixture C2.1 of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide) onto
C2.2) 95 to 5% by weight, preferably 20 to 7% by weight, particularly preferably 15 to 8% by weight, very particularly preferably 13 to 7% by weight, based on component C2, of at least one graft base.

The graft substrate preferably has a glass transition temperature <0° C., preferably <−20° C., particularly preferably <−60° C.

The graft particles in component C2 preferably have a median particle size (D50) of 0.1 to 2 μm, preferably of 0.2 to 1 μm, particularly preferably of 0.3 to 0.7 μm.

The graft particle size distribution and values derived therefrom are determined by ultracentrifugation (W. Scholtan, H. Lange, Kolloid, Z. and Z. Polymere 250 (1972), 782-796).

In a preferred embodiment the graft polymer according to component C2 contains less than 40% by weight, particularly preferably less than 30% by weight, in particular less than 20% by weight, based on the gel fraction of the graft polymer, of graft particles having a particle diameter of greater than 800 mm.

Preferred monomers C2.1.1 are selected from at least one of the monomers styrene, α-methylstyrene and methyl methacrylate; preferred monomers C2.1.2 are selected from at least one of the monomers acrylonitrile, maleic anhydride and methyl methacrylate.

Particularly preferred monomers are C2.1.1 styrene and C2.1.2 acrylonitrile.

Preferred graft substrates C2.2 are diene rubbers (for example based on butadiene or isoprene), diene-vinyl block copolymer rubbers (for example based on butadiene and styrene blocks), copolymers of diene rubbers with further copolymerizable monomers (for example according to C2.1.1 and C2.1.2) and mixtures of the abovementioned rubber types. Particularly preferred graft substrates C2.2 are polybutadiene rubber, styrene-butadiene block copolymer rubbers and mixtures of styrene-butadiene block copolymer rubbers with polybutadiene rubber.

The gel content of the graft polymers C2 is preferably 10% to 40% by weight, particularly preferably 15% to 30% by weight, very particularly preferably 17% to 23% by weight (measured in acetone).

Particularly preferred polymers C2 are for example ABS polymers produced by free-radical polymerization which in a preferred embodiment contain up to 10% by weight, particularly preferably up to 5% by weight, particularly preferably 2% to 5% by weight, in each case based on the graft polymer C2, of n-butyl acrylate.

The graft polymer C2 generally comprises as a consequence of manufacture free copolymer, i.e. copolymer not chemically bound to the rubber substrate, of C2.1.1 and C2.1.2, which has the feature that it can be dissolved in suitable solvents (e.g. acetone).

Component C2 preferably contains free copolymer of C2.1.1 and C2.1.2 which has a weight-average molecular weight (Mw) determined by gel permeation chromatography with a polystyrene standard of preferably 50000 to 200000 g/mol, particularly preferably of 70000 to 160000 g/mol, particularly preferably of 80000 to 120000 g/mol.

Component C3

The composition may contain as a further component C3 (co)polymers of at least one monomer from the group of the vinylaromatics, vinyl cyanides (unsaturated nitriles), (C1 to C8)-alkyl (meth)acrylates, unsaturated carboxylic acids and derivatives (such as anhydrides and imides) of unsaturated carboxylic acids.

Especially suitable as component C3 are (co)polymers of
C3.1 50% to 99% by weight, preferably 65% to 85% by
weight, particularly preferably 70% to 80% by weight based
on the (co)polymer C3 of at least one monomer selected
from the group of the vinylaromatics (for example styrene,
α-methylstyrene), ring-substituted vinylaromatics (for
example p-methylstyrene, p-chlorostyrene) and (C1-C8)-
alkyl (meth)acrylates (for example methyl methacrylate,
n-butyl acrylate, tert-butyl acrylate) and
C3.2 1% to 50% by weight, preferably 15% to 35% by
weight, particularly preferably 20% to 30% by weight based
on the (co)polymer C3 of at least one monomer selected
from the group of the vinyl cyanides (for example unsaturated nitriles such as acrylonitrile and methacrylonitrile),
(C1-C8)-alkyl (meth)acrylates (for example methyl methacrylate, n-butyl acrylate, tert-butyl acrylate), unsaturated
carboxylic acids and derivatives of unsaturated carboxylic
acids (for example maleic anhydride and N-phenylmaleimide).

These (co)polymers C3 are resinous, thermoplastic and
rubber-free. Particular preference is given to the copolymer
of C3.1 styrene and C3.2 acrylonitrile.

(Co)polymers C3 of this kind are known and can be
produced by free-radical polymerization, in particular by
emulsion, suspension, solution or bulk polymerization. The
(co)polymers C3 have a weight-average molecular weight
(Mw) determined by gel permeation chromatography with a
polystyrene standard of preferably 50000 to 200000 g/mol,
particularly preferably of 70000 to 150000 g/mol, particularly preferably of 80000 to 120000 g/mol.

Component D

The composition may contain as component D one or
more further additives distinct from components A, B, C and
E preferably selected from the group consisting of flame
retardants (for example organic phosphorus or halogen
compounds, in particular bisphenol-A-based oligophosphate), anti-drip agents (for example compounds from the
classes of fluorinated polyolefins, silicones, and also aramid
fibers), flame retardant synergists (for example nanoscale
metal oxides), smoke inhibitors (for example zinc borate),
lubricants and demolding agents (for example pentaerythritol tetrastearate), nucleating agents, antistats, conductivity
additives, stabilizers (e.g. hydrolysis, heat-ageing and UV
stabilizers, and also transesterification inhibitors), flow promoters, compatibilizers, further impact modifiers (with or
without core-shell structure), further polymeric constituents
(for example functional blend partners), fillers and reinforcers (for example carbon fibers, talc, mica, kaolin, $CaCO_3$)
and also dyes and pigments (for example titanium dioxide or
iron oxide).

In a preferred embodiment the composition contains at
least one polymer additive selected from the group consisting of lubricants and demolding agents, stabilizers, flow
promoters, compatibilizers, further impact modifiers, further
polymeric constituents, dyes and pigments.

In a particularly preferred embodiment the composition
contains at least one polymer additive selected from the
group consisting of lubricants and demolding agents, stabilizers, flow promoters, compatibilizers, further impact modifiers distinct from component C, further polymeric constituents, dyes and pigments and is free from further polymer
additives.

In a preferred embodiments the composition contains
pentaerythritol tetrastearate as a demolding agent.

In a preferred embodiment the composition contains as a
stabilizer at least one representative selected from the group
consisting of sterically hindered phenols, organic phosphites
and sulfur-based co-stabilizers.

In a particularly preferred embodiment the composition
contains as a stabilizer at least one representative selected
from the group consisting of octadecyl 3-(3,5-di-tert-butyl-
4-hydroxyphenyl)propionate and tris(2,4-di-tert-butylphenyl)phosphite.

In an especially preferred embodiment the composition
contains as a stabilizer a combination of octadecyl 3-(3,5-
di-tert-butyl-4-hydroxyphenyl)propionate and tris(2,4-di-
tert-butylphenyl)phosphite.

Further preferred compositions contain pentaerythritol
tetrastearate as a demolding agent, a combination of octadecyl 3-(3,5-di-tert-butyl-4-hydroxyphenyl)propionate and
tris(2,4-di-tert-butylphenyl)phosphite as a stabilizer, optionally at least one pigment or colorant and are free from further
polymer additives.

Component E

The polyesters contemplated as component E according to
the invention are aliphatic or aromatic polyesters, preferably
aromatic polyesters and in a particularly preferred embodiment polyalkylene terephthalates. In particularly preferred
embodiments reaction products of aromatic dicarboxylic
acids or reactive derivatives thereof, such as dimethyl esters
or anhydrides, and aliphatic, cycloaliphatic or araliphatic
diols and also mixtures of these reaction products are
concerned here.

Particularly preferred polyalkylene terephthalates contain
at least 80% by weight, preferably at least 90% by weight,
based on the dicarboxylic acid component of terephthalic
acid radicals and at least 80% by weight, preferably at least
90% by weight, based on the diol component of ethylene
glycol and/or butane-1,4-diol radicals.

The preferred aromatic terephthalates may contain in
addition to terephthalic acid radicals up to 20 mol %,
preferably up to 10 mol %, of radicals of other aromatic or
cycloaliphatic dicarboxylic acids having 8 to 14 carbon
atoms or aliphatic dicarboxylic acids having 4 to 12 carbon
atoms, for example radicals of phthalic acid, isophthalic
acid, naphthalene-2,6-dicarboxylic acid, 4,4'-diphenyldicarboxylic acid, succinic acid, adipic acid, sebacic acid, azelaic
acid, cyclohexanediacetic acid.

The preferred aromatic polyalkylene terephthalates may
contain in addition to ethylene glycol and/or butane-1,4-diol
radicals up to 20 mol %, preferably up to 10 mol %, of other
aliphatic diols having 3 to 12 carbon atoms or cycloaliphatic
diols having 6 to 21 carbon atoms, for example radicals of
propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-
diol, 2,2,4-trimethylpentane-1,3-diol, 2-ethylhexane-1,3-
diol, 2,2-diethylpropane-1,3-diol, hexane-2,5-diol, 1,4-di(β-
hydroxyethoxy)benzene, 2,2-bis(4-hydroxycyclohexyl)
propane, 2,4-dihydroxy-1,1,3,3-tetramethylcyclobutane,
2,2-bis(4-β-hydroxyethoxyphenyl)propane and 2,2-bis(4-
hydroxypropoxyphenyl)propane (DE-A 2 407 674, 2 407
776, 2 715 932).

The polyalkylene terephthalates may be branched through
incorporation of relatively small amounts of tri- or tetrahydric alcohols or tri- or tetrabasic carboxylic acids, for
example according to DE-A 1 900 270 and U.S. Pat. No.
3,692,744. Examples of preferred branching agents are
trimesic acid, trimellitic acid, trimethylolethane and trimethylolpropane, and pentaerythritol.

Particular preference is given to polyalkylene terephthalates which have been produced solely from terephthalic
acid and the reactive derivatives thereof (e.g. the dialkyl esters thereof) and ethylene glycol and/or butane-1,4-diol, and to mixtures of these polyalkylene terephthalates.

Mixtures of polyalkylene terephthalates contain 1% to 50% by weight, preferably 1% to 30% by weight, of polyethylene terephthalate and 50% to 99% by weight, preferably 70% to 99% by weight, of polybutylene terephthalate.

The preferably used polyalkylene terephthalates preferably have a viscosity number of 0.4 to 1.5 dl/g, preferably 0.5 to 1.2 dl/g, measured in phenol/o-dichlorobenzene (1:1 parts by weight) in a concentration of 0.05 g/ml according to ISO 307 at 25° C. in an Ubbelohde viscometer.

The polyalkylene terephthalates may be produced by known methods (see, for example, Kunststoff-Handbuch, volume VIII, p. 695 et seq., Carl-Hanser-Verlag, Munich 1973).

The compositions (molding materials) produced by the process according to the invention may be used for producing molded articles of any kind. These may be produced by injection molding, extrusion and blow-molding processes for example. A further form of processing is the production of molded articles by thermoforming from previously produced sheets or films.

Examples of such molded articles are films, profiles, housing parts of any type, e.g. for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automobile sector. The compositions according to the invention are also suitable for the production of the following molded articles or molded parts: Internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, molded parts for sanitation and bath equipment, protective grilles for ventilation openings and housings for garden equipment.

On account of their light inherent color which is stable during processing the compositions according to the invention are particularly suitable for in-plant coloring by addition of colorant masterbatches directly during thermoforming.

The compositions according to the invention are moreover particularly suitable for producing molded articles or molded parts having Class A surface requirements and a high-gloss finish which may optionally be subjected partially or completely to a further surface treatment step by, for example, lacquering, film insert molding, metallization by vacuum deposition or electroplating. In the context of the present invention, "high-gloss" and "high-gloss finish" are to be understood as meaning a gloss level determined by reflection in accordance with DIN 67530 at a measuring angle of 60° of at least 95, preferably of at least 97, particularly preferably of at least 99.

The invention therefore also relates to any type of molded articles or molded parts made of the compositions according to the invention having a full or partial high-gloss finish, preferably such molded parts having a complete or partial high-gloss finish, which have optionally been partially or completely subjected to a further surface treatment step by, for example, painting, film insert molding, metallization by vacuum deposition or electroplating.

EXAMPLES

Components Used:
Component A
Linear polycarbonate based on bisphenol A having a weight-average molecular weight Mw of 28000 g/mol (determined by gel permeation chromatography (GPC) in a methylene chloride solvent and with a polycarbonate standard).
Component B1
Trilon® BS: Ethylenediaminetetraacetic acid (EDTA); BASF (Ludwigshafen, Germany)
Component B2
Phenylphosphonic acid (98%), Sigma-Aldrich Chemie GmbH
Component B3
Citric acid (≥99.5%), Merck KGaA
Component B4
Oxalic acid (≥99.0%), Sigma-Aldrich Chemie GmbH
Component B5
Terephthalic acid (98%), Sigma-Aldrich Chemie GmbH
Component B6
Phosphorous acid (99%), (Sigma-Aldrich Chemie GmbH).
Component B7
Fabutit® 313: $Ca(H_2PO_4)_2$; Chemische Fabrik Budenheim KG (Budenheim, Germany)
Component B8
p-toluenesulfonic acid (98%), Alfa Aesar GmbH & Co KG
Component C
ABS blend having a ratio of acrylonitrile:butadiene:styrene, based on the blend, of 20%:18%:62% by weight, containing an ABS polymer produced in emulsion polymerization, precipitated using magnesium sulfate, worked up in an alkaline medium and containing alkaline constituents and magnesium sulfate, an ABS polymer produced in bulk polymerization, and an SAN polymer.
Component D1
Pentaerythritol tetrastearate as lubricant/demolding agent
Component D2
Heat stabilizer, Irganox® B900 (mixture of 80% Irgafos® 168 (tris(2,4-di-tert-butylphenyl)phosphite) and 20% Irganox® 1076 (2,6-di-tert-butyl-4-(octadecanoxycarbonylethyl)phenol); BASF (Ludwigshafen, Germany)
Component D3
Heat stabilizer, Irganox® 1076 (2,6-di-tert-butyl-4-(octadecanoxycarbonylethyl)phenol), BASF (Ludwigshafen, Germany).
Process for Producing Compositions (Molding Materials) from the Employed Components In a first process step (i) the components A, B, C and D were mixed at room temperature and the mixture introduced into the intake zone of a ZSK25 twin-screw extruder from Coperion, Werner & Pfleiderer (Stuttgart, Germany) at a flow rate of 20 kg/h. In the melting and kneading zone of the extruder at speeds of 220 and 500 rpm the mixture was brought to temperatures of 260° C. and 290° C. respectively to melt it, and kneaded at this temperature to disperse the components in one another. The thus compounded mixture was degassed in the subsequent degassing zone of the extruder by applying a negative pressure of 100 mbar (absolute) to the melt. In a second process step (ii) the degassed melt was discharged from the extruder at the abovementioned temperatures of 260° C. or 290° C. via a nozzle and the resulting melt strand was passed through a water bath temperature-controlled to about 30° C. for cooling.

In a third process step (iii) the solidified melt strand was pelletized by means of a strand pelletizer.

Production of the Test Specimens and Testing

The pelletized materials resulting from the respective compounding were processed in an injection molding machine (from Arburg) at melt temperatures of 260° C. or 300° C. and a mold temperature of 80° C. to afford test specimens having dimensions of 60 mm×40 mm×2 mm (for determining yellowness indices and gloss levels) and at a melt temperature of 260° C. and a mold temperature of 80° C. to afford test specimens having dimensions of 150 mm×105 mm×3.2 mm (for determining blistering behavior after storage under hot and humid conditions). Both test specimen types were produced using highly polished injection molds.

The MVR serves as a measure for any polycarbonate molecular weight degradation during the thermal stress of the compounding and is determined on the pellets produced by compounding after drying at 110° C. for 4 h in a circulating air dryer according to ISO1133 at a melt temperature of 300° C. with a piston loading of 5 kg after a hold time of 5 min.

The iMVR is determined under the same conditions as the MVR but with a prolonged hold time of 15 min.

Relative increase of iMVR relative to MVR

ΔMVR(300° C./5 kg, 5 min→15 min)=100%·(iMVR−MVR)/MVR serves as a measure for the polycarbonate molecular weight degradation to be expected in the injection mold at elevated processing temperatures and thus as a measure for the processing stability of the composition in the injection mold.

The natural tone/the inherent color is measured in reflection according to DIN 6174 on specimens having dimensions of 60 mm×40 mm×2 mm and produced at a melt temperature of 260° C./300° C. in an injection mold. The yellowness index (YI) is calculated according to ASTM E313.

The gloss level is measured on platelets having dimensions of 60 mm×40 mm×2 mm and produced at a melt temperature of 260° C./300° C. in an injection mold. The measurement is performed in reflection at a measuring angle of 60° according to DIN 67530.

Serving as further important parameters for characterizing process stability are the absolute changes in the yellowness index and in the gloss level upon increasing the melt temperature in the injection mold from 260° C. to 300° C. which are calculated according to ΔYellowness index (260° C.→300° C.)=yellowness index (300° C.)−yellowness index (260° C.)

and

ΔGloss level (260° C.→300° C.)=gloss level (300° C.)−gloss level (260° C.).

What is assessed is whether the yellowness index measured on test specimens produced at a melt temperature in the injection mold of 260° C. is smaller than 25 and whether the gloss level of these test specimens is greater than 95. Also assessed is whether the absolute changes in the yellowness index and in the gloss level upon increasing the processing temperature in the injection mold from 260° C. to 300° C. are each less than 10. This corresponds to customary requirement profiles for molding materials stable during processing and intended for coloring and high-gloss applications.

Serving as a measure for the hydrolysis resistance of the compositions is the relative change in the MVR measured according to ISO 1133 at 260° C. with a die load of 5 kg with a hold time of 5 min upon storage of the pelletized material for 7 days under hot and humid conditions ("HH storage") at 95° C. and 100% relative humidity. The relative increase in the MVR value relative to the MVR value before the storage in question is calculated as ΔMVR(hydr) which is defined by the formula below:

$$\Delta MVR(hyrdr) = \frac{MVR(\text{after } HH \text{ storage}) - MVR(\text{before storage})}{MVR(\text{before storage})} \cdot 100\%.$$

The propensity for formation of surficial defects with blistering topology is determined on sheets having a geometry of 150 mm×105 mm×3.2 mm and high-gloss surfaces on both sides. These sheets generally exhibit no blistering whatsoever immediately after injection molding. Blistering is assessed visually without using magnifying technical aids (microscopes, magnifying glasses etc.) after three-day storage of these sheets under hot and humid conditions at 40° C. and a relative humidity of >95%. All visually apparent blister defects on both sides of altogether two sheets having the above-defined dimensions (i.e. on an effective surface area of 4·15 cm·10.5 cm=630 cm²) are counted. From experience this purely visual assessment without magnifying technical aids accounts for all defects having a diameter above approximately 100-200 μm. What is assessed is whether this counting reveals less than 10 blister defects, which corresponds to a generally acceptable quality.

TABLE 1

| | Component | 1 | 1b | V2 | V3 | V4 | V4b | V5 | V6 | V7 | V8 |
|---|---|---|---|---|---|---|---|---|---|---|---|
| A | Polycarbonate | 60.28 | 60.28 | 60.28 | 60.28 | 60.28 | 60.28 | 60.28 | 60.32 | 60.32 | 60.32 |
| B1 | EDTA | 0.05 | 0.05 | | | | | | | | |
| B2 | Phenylphosphonic acid | | | 0.05 | | | | | | | |
| B3 | Citric acid | | | | 0.05 | | | | | | |
| B4 | Oxalic acid | | | | | 0.05 | 0.05 | | | | |
| B5 | Terephthalic acid | | | | | | | 0.05 | | | |
| B6 | Phosphorous acid | | | | | | | | 0.01 | | |
| B7 | Ca(H2PO4)2 | | | | | | | | | 0.05 | |
| B8 | p-Toluenesulfonic acid | | | | | | | | | | 0.05 |
| C | ABS | 38.61 | 38.61 | 38.61 | 38.61 | 38.61 | 38.61 | 38.61 | 38.61 | 38.61 | 38.61 |
| D1 | Demolding agent | 0.74 | 0.74 | 0.74 | 0.74 | 0.74 | 0.74 | 0.74 | 0.74 | 0.74 | 0.74 |

TABLE 1-continued

| | Component | 1 | 1b | V2 | V3 | V4 | V4b | V5 | V6 | V7 | V8 |
|---|---|---|---|---|---|---|---|---|---|---|---|
| D2 | Stabilizer | 0.12 | 0.12 | 0.12 | 0.12 | 0.12 | 0.12 | 0.12 | 0.12 | 0.12 | 0.12 |
| D3 | Stabilizer | 0.20 | 0.20 | 0.20 | 0.20 | 0.20 | 0.20 | 0.20 | 0.20 | 0.20 | 0.20 |
| Compounding conditions | | | | | | | | | | | |
| | Speed [rpm] | 220 | 500 | 220 | 220 | 220 | 500 | 220 | 220 | 220 | 220 |
| Properties | | | | | | | | | | | |
| | MVR(300° C./5 kg/5 min) [ml/10 min] | 61 | 68 | 61 | 59 | 61 | 72 | 60 | 54 | 60 | 59 |
| | iMVR(300° C./5 kg/15 min) [ml/10 min] | 61 | 72 | 66 | 61 | 62 | 96 | 61 | 57 | 60 | 60 |
| | ΔMVR(300° C./5 kg, 5 min-->15 min) | 0% | 6% | 8% | 3% | 2% | 33% | 2% | 6% | 0% | 2% |
| | ΔMVR(hydr) [%] | 58 | 58 | 363 | 59 | 64 | 50 | 68 | 58 | 48 | 96 |
| | Yellowness index (260° C.) < 25 | yes | yes | yes | yes | yes | | yes | yes | yes | yes |
| | ΔYellowness index (260° C.-->300° C.) < 10 | yes | yes | yes | yes | yes | | yes | yes | yes | yes |
| | Gloss level @ 60° (260° C.) > 95 | yes | yes | yes | yes | yes | | yes | yes | yes | yes |
| | ΔGloss level @ 60° (260° C.-->300° C.) < 10 | yes | yes | yes | no | yes | | yes | yes | yes | no |
| | Blistering (<10 blisters/630 cm²) | yes | yes | no | no | yes | | no | no | no | no |

The examples in table 1 show that only the inventive molding materials according to example 1/1b produced with and containing EDTA as an acidic compound fully achieve the object of the invention while the compositions according to comparative examples V2 to V8 produced with acids according to the prior art all diverge from the target profile of properties at least in terms of one required property.

Compositions produced with phenylphosphonic acid (V3) show unsatisfactory hydrolysis stability and unsatisfactory blistering behavior.

Compositions produced with citric acid (V2) show unsatisfactory hydrolysis stability and unsatisfactory blistering behavior.

Compositions produced with oxalic acid (V4/V4b) show increased thermally induced polycarbonate molecular weight degradation already during compounding at elevated melt temperatures (i.e. an unsatisfactory processing window in the production of the compounds) and moreover also unsatisfactory processing stability in injection molding of such compounds produced under more intense thermal conditions with respect to polycarbonate molecular weight degradation.

Compositions produced with terephthalic acid, phosphorous acid or calcium dihydrogenphosphate (V5-V7) all show unsatisfactory blistering behavior.

Compositions produced with p-toluenesulfonic acid (V8) show unsatisfactory hydrolysis and gloss level stability and unsatisfactory blistering behavior.

The invention claimed is:

1. A composition containing
   (A) at least one polymer selected from the group of aromatic polycarbonates and aromatic polyester carbonates;
   (B) ethylenediaminetetraacetic acid (EDTA) present in the composition in a proportion of 0.001% to 0.5% by weight based on the weight of the composition, and
   (C) one or more rubber-containing graft polymers and/or rubber-free vinyl (co)polymers.

2. The composition as claimed in claim 1, wherein component (C) contains at least one rubber-containing graft polymer produced by emulsion polymerization.

3. The composition as claimed in claim 1, wherein at least one alkali metal, alkaline earth metal, aluminum or transition metal salt of a strong mineral acid is present.

4. The composition as claimed in claim 3, wherein the salt is magnesium sulfate.

5. A process for producing thermoplastic polycarbonate compositions containing the steps (i), (ii), and optionally (iii), wherein
   in a first step (i),
   (A) at least one polymer selected from the groups of aromatic polycarbonates and aromatic polyester carbonates,
   (B) ethylenediaminetetraacetic acid (EDTA) present in the composition in a proportion of 0.001% to 0.5% by weight based on the weight of the composition, wherein at least one of the components employed in step (i) is alkaline or contains alkaline constituents,
   (C) one or more rubber-containing graft polymers or rubber-free vinyl (co)polymers, and the at least one rubber-containing graft polymer is produced by emulsion polymerization, and
   optionally further components
   are heated by supplying thermal and/or mechanical energy to melt at least component (A), the components are dispersed in one another and subsequently the resulting composition present in the form of a melt is optionally degassed by applying negative pressure,
   and in a further step (ii) the resulting composition is resolidified by cooling and in a further step (iii) is pelletized,
   wherein these further steps (ii) and (iii) may be performed in any desired sequence,
   wherein furthermore as component (C) at least one rubber produced by emulsion polymerization and optionally at least one further component selected from the group consisting of a rubber-containing graft polymers produced by bulk, solution or suspension polymerization and rubber-free vinyl (co)polymers is employed and component (C) contains at least one alkali metal, alkaline earth metal, aluminum or transition metal of a strong mineral acid.

6. A method comprising mixing
   (B) ethylenediaminetetraacetic acid (EDTA) present in the composition in a proportion of 0.001% to 0.5% by weight based on the weight of the composition, and
   (C) one or more rubber-containing graft polymers and/or rubber-free vinyl (co)polymers for stabilizing polycarbonate compositions.

7. A composition produced by a process as claimed in claim 5.

8. A method for the production of molded articles comprising molding the composition as claimed in claim 1.

9. A molded article containing compositions as claimed in claim 1.

10. A composition containing
   (A) 40 to 90 parts by weight based on the weight of the composition of an aromatic polycarbonate having a molecular weight range from 24000 to 32000 g/mol;
   (B) ethylenediaminetetraacetic acid (EDTA) present in the composition in a proportion of 0.001% to 0.2% by weight based on the weight of the composition, and
   (C) one or more rubber-containing graft polymers or rubber-free vinyl (co)polymers, and the at least one rubber-containing graft polymer is produced by emulsion polymerization,
      and wherein the composition comprises magnesium sulfate.

11. A process for producing thermoplastic polycarbonate compositions containing the steps (i), (ii) and optionally (iii), wherein in a first step (i)
   (A) 40 to 90 parts by weight based on the weight of the composition of an aromatic polycarbonate having a molecular weight range from 24000 to 32000 g/mol;
   (B) ethylenediaminetetraacetic acid (EDTA) present in the composition in a proportion of 0.001% to 0.2% by weight based on the weight of the composition, and
   (C) one or more rubber-containing graft polymers or rubber-free vinyl (co)polymers and the at least one rubber-containing graft polymer is produced by emulsion polymerization,
      and wherein the composition comprises magnesium sulfate and optionally further components,
      are heated by supplying thermal and/or mechanical energy to melt at least component (A), the components are dispersed in one another and subsequently the resulting composition present in the form of a melt is optionally degassed by applying negative pressure,
   wherein at least one of the components employed in step (i) is alkaline or contains alkaline constituents
   and in a further step (ii)
   the resulting composition is resolidified by cooling
   and in a further step (iii) is pelletized,
      wherein these further steps (ii) and (iii) may be performed in any desired sequence.

* * * * *